(12) United States Patent
Kazmierski et al.

(10) Patent No.: US 6,372,810 B2
(45) Date of Patent: Apr. 16, 2002

(54) MECHANICALLY FROTHED AND CHEMICALLY BLOWN POLYURETHANE FOAM

(75) Inventors: Daniel W. Kazmierski, Chatsworth; Randall C. Jenkines, Dalton, both of GA (US)

(73) Assignee: The Dow Chemical Company, Midland, MI (US)

( * ) Notice: Subject to any disclaimer, the term of this patent is extended or adjusted under 35 U.S.C. 154(b) by 56 days.

(21) Appl. No.: 09/730,153

(22) Filed: Dec. 5, 2000

(Under 37 CFR 1.47)

Related U.S. Application Data

(63) Continuation of application No. 09/305,569, filed on May 5, 1999, which is a continuation-in-part of application No. 08/785,077, filed on Jan. 17, 1997, now abandoned.
(60) Provisional application No. 60/010,247, filed on Jan. 19, 1996.

(51) Int. Cl.$^7$ .......................... C08G 18/10; B32B 3/02; B32B 33/00
(52) U.S. Cl. .......................... 521/130; 428/95; 521/67; 521/133; 521/159
(58) Field of Search ................ 521/130, 133, 521/159, 67; 428/95

(56) References Cited

U.S. PATENT DOCUMENTS 5,104,693 A * 4/1992 Jenkines ................ 427/358

* cited by examiner

Primary Examiner—Morton Foelak

(57) ABSTRACT

The present invention is a low density polyurethane foam cushion useful as an attached carpet cushion or as a detached carpet underlay. The low density foams of the present invention are prepared by a process wherein a polyurethane foam formulation is blown by both mechanical and chemical processes.

23 Claims, No Drawings

MECHANICALLY FROTHED AND CHEMICALLY BLOWN POLYURETHANE FOAM

CROSS-REFERENCE STATEMENT

This application is a continuation of U.S. patent application Ser. No. 09/305,569, filed May 5, 1999, which is a continuation in part of U.S. patent application Ser. No. 08/785,077 filed Jan. 17, 1997, now abandoned, which claims the benefit of U.S. Provisional Application No. 60/010,247, filed Jan. 19, 1996.

BACKGROUND OF THE INVENTION

This invention relates to polyurethane foam. This invention particularly relates to polyurethane foam useful with and for preparing carpet underlay and attached cushion carpets.

It is known in the art of preparing textile articles, such as carpets, to use polyurethanes as backings in various forms. For example, U.S. Pat. No. 4,296,159 to Jenkines, et al., discloses preparing a tufted or woven article having a unitary backing prepared by applying a polyurethane forming composition to the underside of the tufted or woven article. A different form of polyurethane backing is disclosed in U.S. Pat. No. 5,102,714 to Mobley, et al. wherein the polyurethane backing is a tacky adhesive. It is also known to use polyurethane foam as a cushioning textile backing, as in, for example, U.S. Pat. No. 4,853,280.

There are several properties of polyurethane foams which are important for determining their usefulness in carpet applications. These properties include but are not limited to resiliency, dimensional stability, and cost. Cost is a very important property because of the highly competitive nature of the carpet industry. However, if a carpet does not properly install or rolls up after installation, or if that carpet is unpleasant to walk on due to poor resilience or dimensional stability of the attached or separate polyurethane pads, the carpet is not desirable to purchasers. Thus, there is a substantial body of art relating to preparing polyurethane foams useful for carpet applications wherein the polyurethane foams have good resiliency and dimensional stability and can be prepared at low cost.

One means of preparing polyurethane foams at a lower cost is to reduce the density of the polyurethane foam. Polyurethane foams are generally prepared by admixing an A component, a polyisocyanate, with a B component, an active hydrogen containing material, wherein a gas is either mechanically introduced or produced chemically forming bubbles which form a cell-like structure in the cured polyurethane. The process of introducing the bubbles is known as blowing the formulation. The greater the amount of gas introduced Into a polyurethane formulation, the lower the density of the resultant foam produced therewith. But with polyurethane foams generally and with polyurethane foams used in carpet applications in particular, reducing foam density can also decrease or reduce the properties of the polyurethane foam which can make it a desirable material for use in carpet applications. Therefore, it would be desirable In the art of preparing polyurethane foam for carpet applications to prepare such foam with a substantially lower density than conventional polyurethane carpet foams and yet retain the desirable properties of conventional polyurethane foams.

SUMMARY OF THE INVENTION

In one aspect, the present invention is, in a process for preparing a polyurethane foam pad for use as either an attached carpet cushion or a detached carpet underlay wherein a polyurethane formulation, including a polyisocyanate, is admixed using a frother, the improvement comprising including in the polyurethane formulation from about 0.5 to about 3 parts water per hundred parts of polyol, from about 0.01 to about 3.5 parts urethane catalyst per hundred parts of polyol, and from 1 to 2 parts surfactant per hundred parts of polyol under reaction conditions such the foam is both frothed and chemically blown.

In another aspect the present invention is a polyurethane foam prepared by a process wherein a polyurethane foam formulation is both frothed and chemically blown.

In still another aspect, the present invention is a polyurethane formulation useful for preparing polyurethane foams comprising a polyisocyanate, a polyol, from about 0.5 to about 3 parts water per hundred parts of polyol, from about 0.01 to about 3.5 parts urethane catalyst per hundred parts of polyol, and from 1 to 2 parts surfactant per hundred parts of polyol.

DESCRIPTION OF THE PREFERRED EMBODIMENTS

In one embodiment, the present invention is a polyurethane foam pad integral to a polyurethane backed textile, known as an attached cushion carpet. Preferably the polyurethane backed textile is a carpet or carpet tile having at least one polyurethane foam layer. This application of a polyurethane layer in a carpet is disclosed in, for example, U.S. Pat. No. 4,853,054, to Turner, et al., which is incorporated herein by reference, and U.S. Pat. No. 5,104,693 to Jenkines, et al., also incorporated herein by reference.

In another embodiment, the present invention is a polyurethane foam for use as a detached carpet underlay. Detached carpet underlays are prepared in a manner similar to attached cushion carpet except that the polyurethane foam is applied to a woven polypropylene substrate. After the polyurethane foam has cured, the underlay can be used as supplementary cushioning to attached cushion carpets or as a cushioning support for unpadded carpets.

The polyurethane foams of the present invention are similar to conventionally prepared foams except that they are prepared from formulations having high levels of catalyst, surfactant and water. The high level of water causes a chemical blowing of the foam when the water reacts with a polyisocyanate component of a polyurethane formulation of the present invention. The combination of the mechanical blowing, also called frothing, and chemical blowing from the reaction of a polyisocyanate and water results in polyurethane foam having lower densities than those conventionally used for carpet backings an carpet underlays. The polyurethane foams so produced have sufficiently low densities to be less expensive to produce than conventional polyurethane foams for carpet applications, yet the foams have sufficient resiliency and dimensional stability to be desirable for use in carpet applications.

The low cost polyurethanes foams of the present invention have desirable physical properties for carpet applications. This results from she synergistic combination of mechanical blowing and chemical blowing. This is made possible by the inclusion of high levels of catalyst, water and surfactant in the formulations used to prepare the foams. The foam formulations used to prepare the foams of the present invention have from about 0.5 to about 3 parts water per hundred parts polyol, preferably from about 0.75 to about 2.75 parts water per hundred parts polyol, and more preferably from about 1.5 to about 2.5 parts water per hundred parts polyol. The formulations of the present invention also include from about 0.01 to about 3.5 parts urethane catalyst per hundred parts polyol, and from 1 to 2 parts surfactant per hundred parts polyol.

The resultant polyurethane foams have densities of from about 2 to about 55 pounds per cubic foot, preferably from about 3 to about 30, more preferably from about 8 to about 18, and even more preferably from about 8 to about 14 pounds per cubic foot. Most preferably, the resultant foams have a density of less than about 10 pounds per cubic foot.

An example of the present invention is a polyurethane foam underlay prepared from a formulation such as those disclosed by U.S. Pat. No. 5,104,693 to Jenkines but additionally including from about 0.5 to about 3 parts water per hundred parts of polyol, from about 0.01 to about 3.5 parts urethane catalyst per hundred parts of polyol, and from 1 to 2 part surfactant per hundred parts of polyol. In formulations of this type, the polyol component can be at least one isocyanate reactive material having an average equivalent weight of about 1,000 to about 5,000. The polyisocyanate can be any polyisocyanate in an amount to provide an isocyanate index of about 90 to about 130, wherein at least 30 percent by weight of the polyisocyanate is a soft segment prepolymer which is the reaction product of a stoichiometric excess of MDI or an MDI derivative and an isocyanate reactive organic polymer having an equivalent weight from about 500 to about 5,000, the prepolymer having an isocyanate group content of about 10 to about 30 percent by weight. The underlay is prepared by frothing the reactants with air with further blowing occurring as the water reacts with isocyanate to produce carbon dioxide.

Foam formulations of the present invention include a polyol component. The polyol component of the foam formulation can be any polyol or polyol mixture which can be used to prepare a foam which can withstand the rigorous physical property and handling requirements of foams used in carpet applications. For example, the polyol component can preferably be a polyol mixture having as one part of the mixture a polyol based on a $C_3$–$C_8$ alkylene oxide, which has an equivalent weight of about 1000 to about 5000, and an internal poly(ethylene oxide) block or a terminal ethylene oxide cap constituting about 15 to about 30 percent of the weight of the polyol, or mixture of such polyols wherein the polyol or mixture thereof has an average functionality of about 1.8 to about 2.5, preferably from about 1.8 to about 2.4 and more preferably from about a 1.8 to about 2.3. The other portion of the polyol mixture is preferably a minor amount of a low equivalent weight compound having about 2 active hydrogen containing groups per molecule.

The polyurethane foams of the present invention are prepared with conventional polyurethane catalysts such as: tertiary amine catalysts such as triethylenediamine, N-methyl morpholine, N-ethyl morpholine, diethyl ethanolamine, N-coco morpholine, 1-methyl-4-dimethylaminoethyl piperazine, 3-methoxy-N-dimethylpropylamine, N,N-diethyl-3-diethyl aminopropylamine, dimethylbenzyl amine and the like; organotin catalysts such as dimethyltin dilaurate, dibutyltin dilaurate, dioctyltin dilaurate, stannous octoate and the like; and isocyanurate catalysts such aliphatic and aromatic tertiary amine compounds, organotin compounds, alkali metal salts of carboxylic acids, phenols, symmetrical triazine derivatives, and the like.

If an organotin catalyst is employed, a suitable cure can be obtained using from about 0.01 to about 0.5 parts per 100 parts of the polyol, by weight. By suitable cure, it is meant that a relatively rapid cure to a tack-free state is obtained. If a tertiary amine catalyst is employed, the catalyst preferably provides a suitable cure using from about 0.01 to about 3 parts of tertiary amine catalyst per 100 parts of the polyol, by weight. Both an amine type catalyst and an organotin catalyst can be employed simultaneously in any combination or ratio. If a combination of amine catalyst and organotin catalyst is used, the catalysts can be used in an amount of from about 0.02 to about 3.5 parts per 100 parts of polyol, by weight.

The foams of the present invention are prepared using both mechanical and chemical blowing agents. The mechanical blowing agent is introduced into a foam forming mixture by a mechanical device. The blowing agent is preferably air, however, other gasses, such as carbon dioxide, nitrogen, and the like can be used. The blowing agent is preferably introduced into the polymer by frothing. A frother is a mechanical device which injects the blowing agent into an admixture as it agitates the admixture. Chemical blowing agents as used herein are volatile materials, or materials that produce gaseous materials as the result of a chemical reaction. Chemical blowing agents useful in the present invention include, for example, liquids such as water, volatile halogenated alkanes such as the various chlorfluoromethanes and chlorfluoroethanes; azo-blowing agents such as azobis(formamide). Water is the preferred chemical blowing agent.

The foams of the present invention are prepared from formulations including fillers. The fillers are preferably aluminum oxide trihydrate (alumina), calcium carbonate, barium sulfate or mixtures thereof. Other fillers can be used instead of, or in addition to, the preferred fillers. The formulations used to prepared the polyurethane foams of the present invention include fillers at a level of from about 80 parts per hundred parts of polyol to about 250 parts per hundred parts of polyol.

While the above polyisocyanates, fillers and polyols are examples of useful materials which can be included in the formulations of the present invention, other materials can also be used. The polyisocyanate component of the formulations of the present invention can be advantageously selected from organic polyisocyanates, modified polyisocyanates, isocyanate-based prepolymers, and mixtures thereof. These can include aliphatic and cycloaliphatic isocyanates, but aromatic and especially multifunctional aromatic isocyanates are preferred. Preferred polyisocyanates are 2,4- and 2,6-toluenediisocyanate and the corresponding isomeric mixtures; 4,4'-, 2,4'- and 2,2'-diphenylmethanediisocyanate and the corresponding isomeric mixtures; mixtures of 4,4'-, 2,4'- and 2,2'-diphenylmethanediisocyanates and polyphenyl polymethylene polyisocyanates PMDI; and mixtures of PMDI and toluene diisocyanates. Also useful for preparing the polyurethanes of the present invention are aliphatic and cycloaliphatic isocyanate compounds such as 1,6-hexamethylene-diisocyanate; 1-isocyanato-3,5,5-trimethyl-1-3-isocyanatomethyl-cyclohexane; 2,4- and 2,6-hexahydrotoluenediisocyanate, as well as the corresponding isomeric mixtures; 4,4'-, 2,2'- and 2,4'-dicyclohexylmethanediisocyanate, as well as the corresponding isomeric mixtures.

Also advantageously used for the polyisocyanate component of the formulations of the present invention are the so-called modified multifunctional isocyanates, i.e., products which are obtained through chemical reactions of the above diisocyanates and/or polyisocyanates. Exemplary are polyisocyanates containing esters, ureas, biurets, allophanates and preferably carbodiimides and/or uretonimines; isocyanurate and/or urethane group containing diisocyanates or polyisocyanates. Liquid polyisocyanates containing carbodiimide groups, uretonimine groups and/or isocyanurate rings, having isocyanate groups (NCO) contents (42/polyisocyanate mwt) of from about 10 to about 40 weight percent, more preferably from about 20 to about 35 weight percent, can also be used. These include, for example, polyisocyanates based on 4,4'-, 2,4'- and/or 2,2'-diphenylmethane diisocyanate and the corresponding isomeric mixtures, 2,4- and/or 2,6-toluenediisocyanate and the corresponding isomeric mixtures; mixtures of diphenylmethane diisocyanates and PMDI and mixtures of toluenediisocyanates and PMDI and/or diphenylmethane diisocyanates.

Suitable prepolymers also useful with the present invention are prepolymers having NCO contents of from about 5 to about 40 weight percent, more preferably from about 15 to about 30 weight percent. These prepolymers are prepared by reaction of the di- and/or polyisocyanates with materials including lower molecular weight diols, triols, but also they can be prepared with multivalent active hydrogen compounds such as di- and tri-amines and di- and tri-thiols. Individual examples are aromatic polyisocyanates containing urethane groups, preferably having NCO contents of from about 5 to about 40 weight percent, more preferably about 20 to about 35 weight percent, obtained by reaction of diisocyanates and/or polyisocyanates with, for example, lower molecular weight diols, triols, oxyalkylene glycols, dioxyalkylene glycols or polyoxyalkylene glycols having molecular weights up to about 800. These polyols can be employed individually or in mixtures as di- and/or polyoxyalkylene glycols. For example, diethylene glycols, dipropylene glycols, polyoxyethylene glycols, polyoxypropylene glycols and polyoxypropylenepolyoxyethylene glycols can be used.

Particularly useful in the present invention are: (i) polyisocyanates having an NCO content of from 8 to 40 weight percent containing carbodiimide groups and/or urethane groups, from 4,4'-diphenylmethane diisocyanate or a mixture of 4,4'- and 2,4'-diphenylmethane diisocyanates; (ii) prepolymers containing NCO groups, having an NCO content of from about 20 to about 35 weight percent, based on the weight of the prepolymer, prepared by the reaction of polyoxyalkylene polyols, having a functionality of preferably from 2 to 4 and a molecular weight of from about 800 to about 15,000 with 4,4'-diphenylmethane diisocyanate or with a mixture of 4,4'- and 2,4'-diphenylmethane diisocyanates and mixtures of (i) and (ii); and (iii) 2,4- and 2,6-toluene-diisocyanate and the corresponding isomeric mixtures. PMDI in any of its forms can also be used and is preferred. In this case it preferably has an equivalent weight between about 125 and about 300, more preferably from about 130 to about 175, and an average functionality of greater than about 2. More preferred is an average functionality of from about 2.5 to about 3.5. The viscosity of the polyisocyanate component is preferably from about 25 to about 5,000 centipoise (cps) (0.025 to about 5 PaŸs), but values from about 100 to about 1,000 cps at 25° C. (0.1 to 1 PaŸs) are preferred for ease of processing. Similar viscosities are preferred where alternative polyisocyanate components are selected. Still, preferably, the polyisocyanate component of the formulations of the present invention is selected from the group consisting of MDI, PMDI, an MDI prepolymer, a PMDI prepolymer, a modified MDI and mixtures thereof.

Polyfunctional active hydrogen containing materials useful with the present invention can include materials other than those already described hereinabove. Active hydrogen containing compounds most commonly used in polyurethane production are those compounds having at least two hydroxyl groups. Those compounds are referred to herein as polyols. Representatives of suitable polyols are generally known and are described in such publications as *High Polymers*, Vol. XVI, "Polyurethanes, Chemistry and Technology" by Saunders and Frisch, Interscience Publishers, New York, Vol. I, pp. 32–42, 44–54 (1962) and Vol. II, pp. 5–6, 198–199 (1964); *Organic Polymer Chemistry* by K. J. Saunders, Chapman and Hall, London, pp. 323–325 (1973); and *Developments in Polyurethanes*, Vol. I, J. M. Burst, ed., Applied Science Publishers, pp. 1–76 (1978). However, any active hydrogen containing compound can be used with the present invention. Examples of such materials include those selected from the following classes of compositions, alone or in admixture: (a) alkylene oxide adducts of polyhydroxyalkanes; (b) alkylene oxide adducts of non-reducing sugars and sugar derivatives; (c) alkylene oxide adducts of phosphorus and polyphosphorus acids; and (d) alkylene oxide adducts of polyphenols. Polyols of these types are referred to herein as "base polyols". Examples of alkylene oxide adducts of polyhydroxyalkanes useful herein are adducts of ethylene glycol, propylene glycol, 1,3-dihydroxypropane, 1,4-dihydroxybutane, and 1,6-dihydroxyhexane, glycerol, 1,2,4-trihydroxybutane, 1,2,6-trihydroxyhexane, 1,1,1-trimethylolethane, 1,1,1-trimethylolpropane, pentaerythritol, polycaprolactone, xylitol, arabitol, sorbitol, mannitol, and the like. Preferred herein as alkylene oxide adducts of polyhydroxyalkanes are the ethylene oxide adducts of trihydroxyalkanes. Other useful adducts include ethylene diamine, glycerin, ammonia, 1,2,3,4-tetrahydroxy butane, fructose, and sucrose.

Also preferred are poly(oxypropylene) glycols, triols, tetrols and hexols and any of these that are capped with ethylene oxide. These polyols also include poly (oxypropyleneoxyethylene)polyols. The oxyethylene content should preferably comprise less than about 80 weight percent of the total polyol weight and more preferably less than about 40 weight percent. The ethylene oxide, when used, can be incorporated in any way along the polymer chain, for example, as internal blocks, terminal blocks, or randomly distributed blocks, or any combination thereof.

Polyamines, amine-terminated polyols, polymercaptans and other isocyanate-reactive compounds are also suitable in the present invention. Polyisocyanate polyaddition active hydrogen containing compounds (PIPA) are particularly preferred for use with the present invention. PIPA compounds are typically the reaction products of TDI and triethanolamine. A method for preparing PIPA compounds can be found in, for example, U.S. Pat. No. 4,374,209, issued to Rowlands.

Another preferred class of polyols are "copolymer polyols", which are base polyols containing stably dispersed polymers such as acrylonitrile-styrene copolymers. Production of these copolymer polyols can be from reaction mixtures comprising a variety of other materials, including, for example, catalysts such as azobisisobutyro-nitrile; copolymer polyol stabilizers; and chain transfer agents such as isopropanol.

It is often preferable to premix all of the components except the polyisocyanate (and the blowing agent when a gas is used) to form a "B" component. The polyisocyanate and the B component are admixed and then the blowing agent gas is blended in using, for example, an OAKES FROTHER* (*OAKES FROTHER is a trade designation of the E. T. Oakes Corporation). The composition is preferably applied to a textile or other substrate prior to any significant level of curing using equipment such as a doctor knife, air knife, or extruder to apply and gauge the layer. In the alternative, the forming polyurethane can be applied by forming it into a layer using a moving belt, allowing it to partially cure, and then marrying it to the textile using equipment such as a double belt laminator. After application of the foam layer, the polyurethane is cured by applying heat by means of an infrared oven, open flame forced draft convection impingement oven, heated plates or the like.

The polyurethane underlays of the present invention can be prepared in a single step or in two or more steps. In a single step process, the A and B polyurethane components including the high water, catalyst and surfactants levels of the present invention are all admixed in a frother at the same time and applied to a textile or other substrate. In a two step process, some or all of the water, catalyst, and optionally other components of the polyurethane formulation are added to the formulation after it has been frothed. Preferably this is done using a static mixer but and means of adding and mixing the components which does not substantially remove or reduce the level of entrapped gasses added by frothing can be used.

Textiles useful with the present invention can include broadloom carpet, automotive carpet, fabrics for automotive trim and automotive trunk liners. In addition, the textiles useful with the present invention can include synthetic playing surfaces, woven polymeric scrim, non woven polymeric scrim, wall coverings, sheet polymers, furniture covers, and the like. One preferred embodiment of the present invention is carpet tile prepared by incorporating the catalysts of the present invention into a carpet tile production process such as that disclosed in U.S. Pat. No. 4,657,790 to Wing, et al. The '790 Wing, et al. patent is incorporated herein by reference.

The following examples is provided to illustrate the present invention. The example is not intended to limit the scope of the present invention and it should not be so interpreted. Amounts are in weight parts or weight percentages unless otherwise indicated.

EXAMPLE 1

46 parts of a 10 percent ethylene oxide capped propylene oxide polyol having di-hydroxy functionality and a molecular weight of 2,000, hereinafter referred to as The Diol; 46 parts of an ethylene oxide, propylene oxide heteropolyol wherein the ratio of ethylene oxide to propylene oxide is 8:92 and the polyol has tri-hydroxy functionality and a molecular weight of 3,000; and 8 parts of diethylene glycol are admixed. Into this mixture is further admixed 190 parts calcium carbonate. The admixture is then mixed and heated to 120° F. (48.9° C.) and then allowed to cool to 72° F. (22.2° C.) and is hereinafter referred to as Mixture A.

290 parts of Mixture A is admixed with: 1.8 parts of 1.25 percent solution of UL-6* in The Diol; 9 parts of a solution of 20 percent water dissolved in The Diol; 7.5 parts of a 20 percent solution of L5614 silicone surfactant* dissolved in The Diol; and 73 parts of an MDI prepolymer prepared by reacting a 45:55 mixture of dipropylene glycol and tripropylene glycol with MDI and a PMDI having an isocyanate functionality of 2.3 and a 14 percent o'p'-MDI isomer content, wherein the MDI prepolymer has an isocyanate content of 27.5 percent. This admixture is hereinafter referred to as Mixture B. *(UL-6 is a trade designation of Whitco Chemical Corp. and is has the chemical name: diisooctylmercaptoacetate; L5614 silicone surfactant is a trade designation of OSI Specialties Inc. and is a linear siloxane—polyoxyalkylene block copolymer having an average molecular weight of about 100,00.)

Mixture B is frothed using compressed air and an OAKES FROTHER* (*OAKES FROTHER is a trade designation of the E. T. Oakes Corporation). The resulting froth has a density of about 422 g/l. The froth is applied using a knife with a gap of 190 mils (0.48 cm) onto one side of a 2.8 oz/yd$^2$ (95 g/m$^2$) woven polypropylene carrier material. The resultant polyurethane foam backed textile is trimmed and rolled and cut for testing. Physical testing of the polyurethane foam produced the following results: foam density is 12.1 lbs/ft$^3$ (194 g/l), fine cell structure of 3–4 cell/mm, and excellent surface appearance indicated by no visible pitting or voids.

EXAMPLE 2

Comparative Example A

The formulations displayed below in the Table are admixed and applied to a carrier substantially as in Example 1. The results from physical testing is also disclosed therein.

TABLE

| Components phpp | EXAMPLE 2 | COMPARATIVE EXAMPLE A |
| --- | --- | --- |
| Water | 2.0 | 0.5 |
| Polyol A | 90 | 90 |
| Diethylene glycol | 10 | 10 |
| Alumina trihydrate | 50 | 50 |
| Calcium carbonate | 60 | 60 |
| 1% UL-6 in Polyol B | 2.25 | 1.5 |
| 25% L-5614 in Polyol B | 8.0 | 4.0 |
| Polyisocyanate | 71.9 | 45.2 |
| NCO Index | 103 | 103 |
| Cup Weight g/l | 830 | 864 |
| Gap, cm | 0.317 | 0.317 |
| Sample thickness, cm | 1.229 | 0.315 |
| Sample weight, g | 17.45 | 17.06 |
| Density, g/l | 182.7 | 698.0 |

Polyol A is a 15 weight percent ethylene oxide capped glycerine inititated polyporplene oxide polyol having a molecular weight of about 4800.

Polyol B is a 10 weight percent ethylene oxide capped, 2000 molecular weight diol.

Polyisocyanate is a 1:1 by weight mixture of (a) a 181 equivalent weight prepolymer of MDI and Dipropylene glycol and triporplene glycol and (b) a polymeric MDI having a functionality of 2.34 and a O'P MDI content of 14 percent.

What is claimed is:

1. A process for preparing a polyurethane foam pad for use as either an attached carpet cushion or a detached carpet underlay, said process comprising admixing a polyurethane formulation under reaction conditions such that said polyurethane formulation is both frothed and chemically blown, said polyurethane formulation comprising:

a) at least one isocyanate-reactive material having an average equivalent weight of about 1,000 to about 5,000;

b) from about 0.5 to about 3 parts water per hundred parts of said at least one isocyanate-reactive material;

c) from about 0.01 to about 3.5 parts urethane catalyst per hundred parts of said at least one isocyanate-reactive material;

d) from about 1 to about 2 parts surfactant per hundred parts of said at least one isocyanate-reactive material; and e) an isocyanate-based prepolymer prepared by reaction of an isocyanate with a polyol having a molecular weight of up to about 800.

2. The process of claim 1 wherein the formulation includes from about 0.01 to about 3.0 parts catalyst.

3. The process of claim 1 wherein the formulation includes from about 0.02 to about 2.5 parts catalyst.

4. The process of claim 1 wherein the formulation includes from about 0.02 to about 2 parts catalyst.

5. The process of claim 1 wherein the formulation includes from about 0.02 to about 1.8 parts catalyst.

6. The process of claim 1 wherein the formulation includes from about 0.02 to about 1.6 parts catalyst.

7. The process of claim 1 wherein the formulation includes from about 0.02 to about 1.4 parts catalyst.

8. The process of claim 1 wherein the formulation includes from about 0.02 to about 1.2 parts catalyst.

9. The process of claim 1 wherein the formulation includes from about 0.02 to about 1 part catalyst.

10. The process of claim 1 wherein the formulation includes from about 0.02 to about 0.5 part catalyst.

11. The process of claim 1 wherein the formulation includes from about 0.02 to about 0.05 part catalyst.

12. The process of claim 1 wherein the formulation includes from about 0.02 to about 0.03 part catalyst.

13. A polyurethane foam prepared by the process of claim 1.

14. The foam of claim 13 wherein the foam has a density of from about 3 to about 30 pounds per cubic foot.

15. The foam of claim 13 wherein the foam has a density of from about 8 to about 18 pounds per cubic foot.

16. The foam of claim 13 wherein the foam has a density of from about 8 to about 14 pounds per cubic foot.

17. The foam of claim 13 wherein the foam has a density of from about 8 to about 10 pounds per cubic foot.

18. The foam of claim 13 wherein the foam has a density of less than about 10 pounds per cubic foot.

19. The foam of claim 13 wherein the foam is useful as an attached foam cushion.

20. The foam of claim 13 wherein the foam is useful as a detached foam underlay.

21. The process of claim 1, wherein said polyurethane formulation further comprises an organic polyisocyanate, a modified polyisocyanate, or a combination of an organic polyisocyanate and a modified polyisocyanate.

22. The process of claim 1, wherein said isocyanate-based prepolymer is an MDI prepolymer.

23. The process of claim 1, wherein said isocyanate-based prepolymer is prepared by reaction of an isocyanate with at least one of dipropylene glycol and tripropylene glycol.

* * * * *